United States Patent [19]

Bell

[11] Patent Number: 4,882,401

[45] Date of Patent: Nov. 21, 1989

[54] SLOW GEL/CURE SYSTEMS BASED ON DIALKYLZINC FOR DICYCLOPENTADIENE POLYMERIZATION

[75] Inventor: Andrew Bell, New Castle, Del.

[73] Assignee: Hercules Incorporated, Wilmington, Del.

[21] Appl. No.: 250,209

[22] Filed: Sep. 28, 1988

[51] Int. Cl.[4] .......................... C08F 4/50; C08F 32/00; C08F 36/00
[52] U.S. Cl. ..................................... 526/119; 526/139; 526/141; 526/142; 526/190; 526/281; 526/282; 526/283; 264/328.2
[58] Field of Search ............... 526/190, 283, 139, 119, 526/141, 142, 281, 282; 264/328.2, 328.6

[56] References Cited

U.S. PATENT DOCUMENTS 3,639,267  2/1972  Vandenberg ................... 526/190 X
4,080,491  3/1978  Kobayashi et al. ................. 526/137

FOREIGN PATENT DOCUMENTS 53-24400  3/1978  Japan ................................... 526/283

OTHER PUBLICATIONS

Journal of Catalysis 44, 416–420, Kazuaki Ichikawa, Osamu Watanabe, Toru Takagi,[1] and Kazuo Fukuzumi.

*Primary Examiner*—Joseph L. Schofer
*Assistant Examiner*—F. M. Teskin
*Attorney, Agent, or Firm*—Mark Goldberg

[57] ABSTRACT

A process for preparing molded objects wherein a liquid reaction mass comprised of a metathesis polymerizable cycloolefin, a metathesis polymerization catalyst, a catalyst activator and a reaction rate moderator are charged to a mold wherein polymerization will take place, the improvement wherein said catalyst activator comprises a dialkylzinc compound. Significantly increased gel and cure times are obtained with the dialkylzinc compounds as compared to the use of aluminum alkyl activator compounds. The gel and cure times may be further controlled by the addition of a phenolic compound to the tungsten or molybdenum compound or by the addition of a Lewis base.

10 Claims, No Drawings

SLOW GEL/CURE SYSTEMS BASED ON DIALKYLZINC FOR DICYCLOPENTADIENE POLYMERIZATION

This invention relates to the polymerization of cycloolefins under the influence of an alkylzinc-activated metathesis catalyst system. In particular, it relates to an alkylzinc activator whose activation rate is significantly slower and more subject to control than that of presently used activator systems.

Preparation of thermoset cycloolefin polymers via metathesis catalysts is a relatively recent development in the polymer art. Klosiewicz in U.S. Pat. Nos. 4,400,340 and 4,520,181 teaches preparation of such polymers from dicyclopentadiene and other similar cycloolefins via a two-stream reaction injection molding technique wherein a first stream, including the catalyst, and a second stream, including a catalyst activator, are combined in a mix head and immediately injected into a mold where, within a matter of seconds, polymerization and molding to a premanently fixed shape take place simultaneously.

In the presence of a metathesis catalyst system, polymerization takes place extremely rapidly even at low temperatures. In fact, polymerization occurs so rapidly that it is not unusual for the monomer to polymerize to a solid immobile condition before the mixed streams can be transferred to the mold. To overcome this difficulty, Klosiewicz teaches the inclusion of a reaction rate moderator in the activator stream to delay the catalyst activation until the reaction mass is totally within themold. The total time from mixing until polymerization is substantially complete is still just a matter of seconds.

In the typical system, according to Klosiewicz, the catalyst component is a tungsten or molybdenum halide and the activator is ana alkyl aluminum compound. The reaction rate moderator can be, e.g., an ester, ether, ketone or nitrile.

Due to the extremely rapid rate of reaction of cycloolefins, even in the presence of the rate-moderated catalyst, useful polymerization has heretofore been accomplished almost exclusively by the reaction injection molding (RIM) process using the two-stream process of Klosiewicz. Even in RIM processes, the short gelation times limit the application to relatively small items and to relatively non-detailed molds. The polymerization mass cannot readily be employed in thermoset molding techniques such as pour, rotational and resin transfer (RTM) molding applications which require relatively long mold filling times.

It has been found possible (see Leach U.S. Pat. No. 4,458,037) to extend the gelation time by use of a dialkyl aluminum iodide activator moderated by di-n-butyl ether. When heated to 80° C., this mixture polymerizes in about 15 seconds. This system is also unsatisfactory in procedures where filling of the mold takes place slowly since the mold temperature must be held low enough during the filling operation that the reaction mixture remains flud until the mold is entirely filled and then raised to the reaction temperature. For commercially practical production rates to be attained, the differential between mold filling temperature and polymerization reaction temperature must be smaller than is possible using the catalyst of Leach. One way to achieve this is by maintaining the mold at an elevated temperature.

It also has been found possible (see Nelson U.S. Pat. No. 4,727,125) to delay the onset of gelation or viscosity buildup of metathesis polymerizable cycloolefins at temperature up to at least about 80° C. by employing as a reaction rate moderator a sterically unhindered or partially unhindered nucleophilic Lewis base. Lewis bases where can be employed are usually unsaturated cyclic amines such as, e.g., pyridine, 2-,3-,4-, or 3,4-disubsittuted pyrazines, quinoline and quinoxaline and cyclic saturated polycyclic amines such as hexamethylene tetramine and 1,4-diazabicyclo[2.2.2]octane. Other suitable Lewis bases include phenanthridine, pyrimidine, isoquinoline and substituted derivatives of these materials. The sterically unhindered or partially unhindered nucleophilic Lewis bases can be employed in conjunction with conventional metathesis catalysts to polymerize any metathesis polymerizable cyclic olefin.

Most strained ring non-conjugated cycloolefins are metathesis polymerizable. These include, for example, dicyclopentadiene, higher cyclophentadiene, oligomers, nobornene, norbornadiene, 4-alkylidene norbornenes, dimethanooctahydronaphthalene, dimethanohexahydronaphthalene and substituted derivatives of these compounds. The preferred cyclic olefin monomer is dicyclopentadiene or a mixture of dicyclopentdiene with other strained ring hydrocarbons in ratios of 1 to 99 mole % of either monomer, preferably about 75 to 99 mole % dicyclopentadiene.

The metathesis catalyst system is comprised of two parts, i.e., a catalyst component and an activator. The catalyst component can be either a molybdenum or a tungsten halide or such a halide having two valences satisfied by oxygen rather than halogen. The preferred catalyst component is a tungsten halide, and preferably a mixture or complex of tungsten hexachloride ($WCl_6$) and tungsten oxytetrachloride ($WOCl_4$) in a molar ratio of $WOCl_4$ to $WCl_6$ of about 1:9 to about 2:1. This mixture or complex is prepared by contacting essentially pure $WCl_6$ with a controlled portion of an oxygen donor. Useful oxygen donors include, e.g., oxygen, a hydrated salt, water, a wet molecular sieve and alkyl alcohols. The most preferred oxygen donor is t-butanol. Complete details of the catalyst preparation can be found in Klosiewicz, U.S. Pat. No. 4,568,660.

The tungsten or molybdenum compound is not normally soluble in the cycloolefin, but can be solubilized by complexing it with a phenolic compound. The compound is first suspended in a small amount of an inert diluent such as benzene, toluene, xylene or chlorinated benzene to form a 0.1 to 1 mole per liter slurry. The phenolic compound is added to the slurry in a molar ratio of about 1:1 to 1:3 catalyst compound to phenolic compound nd a stream of dry inert gas is passed through the agitated solution to remove hydrogen chloride gas. Preferred phenolic compounds include phenol, alkyl phenols, halogenated phenols or phenolic salts such as lithium or sodium phenoxide. The most preferred phenolic compounds are 2,6-di-tert-butyl-p-cresol (BHT), 2,6-diisopropylphenol (DIPP), 2,6-dichlorophenol, t-butyl phenol, t-octyl phenol and nonyl phenol.

To prevent premature polymerization of the catalyst component/monomer solution, which would occur within a matter of hours, about 1 to 5 moles of a Lewis base or a chelating agent are added per mole of catalyst compound. Preferred chelants include acetylacetones, dibenzoyl methane and alkyl acetoacetates, where the alkyl groupcontains from 1 to 10 carbon atoms. Preferred Lewis bases are nitriles and ethers such as benzonitrile nd tetrahydrofuran. The improvement in stability and shelf-life of the catalyst component/monomer solution is obtained whether the complexing agent is added before or after the phenolic compound. When this complexed catalyst component is added to purified cycloolefin, for example, dicyclopentadiene, it forms a solution which is stable and has a shelf-life of several months in the absence of an activator.

In previous patents covering the metathesis polymerization of dicyclopentadiene, such as Klosiewicz, the activator compound ws an alkyl aluminum compound, either a trialkyl or dialkyl aluminum halide. It was also suggested that alkyl tin compounds could be employed in the metathesis of dicyclopentadiene.

It is the objct of this invention to provide cycloolefin polymerization feedstreams having substantially increased gelation times at normal molding temperatures compared with such mixtures heretofore known.

It is also an object of this invention to sufficiently increase gelation times so that if preferred a single feedstream may be employed.

It is further an object of this invention to, if desired, to add different Lewis bases to the alkylzinc catalyst activator and different phenolic compounds to the metathesis polymerization catalyst to degrease gel and cure times and to reduce the level of residual monomer remaining in the polymer after polymerization.

In accordance with this invention, it has been found that the onset of gelation or viscosity build-up of metathesis polymerizable cycloolefins at temperature up to at least about 80° C. can be significantly delayed by employing an alkylzinc, an alkylzinc halide such as alkylzinc chlorides or an aromatic zinc compound such as diphenylzinc metathesis catalyst system. A dialkylzinc compound is preferred. Particularly preferred dialkylzinc activator compounds include diethylzinc, di-n-butylzinc and diisobutylzinc. The activator is readily soluble in the cycloolefin. It is prepared by mixing the alkylzinc compound or a mixture of alkylzinc compounds with the Lewis base or mixture of Lewis bases at a 1:1 to 1:5 molar ratio. While either order of addition, i.e., Lewis base to alkylzinc compound or alkylzinc compound to Lewis base, can be used, it is preferred to add the Lewis base to the alkylzinc with agitation. The reaction s highly exothermic, and it is desirable to control the rate of Lewis base addition to the alkylzinc compound so as to maintain the temperature at less than approximately 50° C. to prevent decomposition of the rate moderator complex. In the case of solid Lewis bases, the base can be added as the solid or dissolved in a suitable nonreactive solvent such as toluene. The activator can also be prepared by dissolving or suspending the Lewis base in the cycloolefin and adding the alkylzinc component. Lewis bases which can be employed are usually unsaturated cyclic amines such as, e.g., pyridine, 2-,3-,4-, or 3,4-di-substituted pyrazines, quinoline and quinoxaline, dibutylether, bis(methoxy)ethyl ether, trialkyl phosphines, trialkyl phosphites, triaryl phosphines and triaryl phosphites and cyclic saturated polycyclic amines such as hexamethylene tetramine and 1,4-diazabicyclo[2.2.2]octane. Other suitable Lewis bases include phenanthridine, pyrimidine, isoquinoline and substituted derivatives of these materials. Preferred Lewis bases are pyridine and pyrazine.

When the two parts of the catalyst system are combined, the resulting cycloolefin (for example dicyclopentadiene) to catalyst compound ratio will be from about 500:1 to about 15,000:1 on a molar basis, preferably 2000:1 and the catalyst compound to alkylzinc ratio will be from about 1:2 to about 1:5.

A cycloolefin reaction mixture activated by an alkylzinc moderator according to this invention remains fluid for a relatively long time at room temperature prior to forming a gel. It takes as much as 30 times longer for the gel to form according to this invention when compared to the prior art use of alkyl aluminum activators. Thus the catalyst components need not be mixed and immediately injected into a mold. While the RIM technique can be employed, processing is not limited to the RIM technique. Moreover, the RIM technique can be used with a premixed reactive solution (i.e., cycloolefin containing both catalyst and activator) and materials can be charged directly into the heated mold without using a mix head on the molding machine.

The great advantage of using the activators of this invention results from the extended gel time that they provide at convenient molding temperatures, i.e., about 80° C. At 80° C., the gel time can be extended to as long as 90 seconds and more; whereas solutions containing the conventional alkyl aluminum activators gel within 5 seconds. The method of obtaining extended gel time is especially useful as purer sources of dicyclopentadiene monomer are developed which in itself significantly shortens the gel time, since impurities have the effect of lengthening the gelation period. The extended gel time, during which the reaction mixture remains highly fluid, allows the reaction mixture to be used in techniques where molds are filled slowly. For example, the mixture can be employed in rotational molding where centifugal force is employed to distribute the mixture and where the polymerization reaction cannot start until uniform distribution is achieved. The mixtures are also useful in preparing polymer articles filled with glass or other fibrous mat reinforcement where the mixture must remain fluid until it has completely impregnated the mat. Manufacture of large objects, where the volume of the mold, per se, necessitates long filling time, can also be facilitated by using the activators of this invention. Using the activators described in this invention, molds can be charged at the polymerization temperature in most cases.

Although the zinc activator compounds greatly slow down the polymerization reaction as compared to aluminum activator compounds, it has been found that if desired the reaction may be slowed further by addition of Lewis bases to the activator or speeded up by changing the phenolic compound added to the catalyst.

In the known processes, where RIM processing is usually contemplated, combining of the components is most conveniently accomplished by mixing equal parts of two solutions, one of which contains twice the total desired concentration of catalyst component, and the other of which contains twice the total desired concentration of activator. This is possible, but not necessary, when a rate moderator is employed. Since the reactive mixture does not gel immediately, it is frequently convenient to add one part of the system to substantially all of the cycloolefin and, just prior to the polymerization and molding, add a concentrate of the other part.

The invention is illustrated by the following examples. In these examples, the catalyst component was prepared by suspending a $WCl_6/WOCl_4$ complex in toluene, reacting it with phenol to solubilize it and complexing it with acetyl acetone. This product was diluted to a concentration between 0.1 M and 0.5 M by adding sufficient additional toluene. An approximately 1.0 M toluene solution of an alkylzinc compound was prepared. In some examples, one or two equivalents of Lewis base or phenolic compound was added to form an activator for dicyclophentadiene polymerization.

CONTROL EXAMPLES

Stock solutions were prepared under a nitrogen atmosphere. In a nitrogen-sparged vessel was charged 100 ml of dicyclopentadiene (DCPD) monomer to which was added three equivalents of aluminum alkyl reagent, i.e., 2.20 ml of the standard 1.0 M 85:15:1 tri-n-octyl aluminum/dioctyl aluminum iodide/diglyme (dimethyl ether of diethylene glycol) mixture and the mixture was mixed well. This was known as "Component A." In a separate vessel was charged 100 ml DCPD to which was added 1.467 ml of a 0.5 M tungsten catalyst component solution (or an equivalent number of moles of tungsten). This was known as "Component B." 2.5 ml of each solution was injected into a nitrogen-sparged vessel. The DCPD was 98.7% pure monomer in Control Examples 1 to 4. The same procedure was carried out with DCPD which was 99.4% pure monomer for Control Examples 5 to 8. In Control Examples 1, 2, 5 and 6 the mixture was at room temperature (28° C.) while in Control Example 3, 4, 7 and 8 the vessel was immersed in a constant temperature bath matintained at 80° C. The control samples contained DCPD/W/Al in a molar ratio of 2000:1:3.

The time from mixture of the two DCPD solutions until formation of a non-fluid gel was noted and recorded as the gel time. Similarly the time from mixture of the solutions until the temperature reaches the final exotherm temperature (the highest reached) was noted and recorded as the induction time or cure time.

In addition to measuring gel and cure times and residual DCPD monomer level, a measurement of swell value was made. The swell value is an indication of the degree of crosslinking in the polymer. The general procedure used for swell value determinations is as follows: A 5 g sample of polymer is removed from its test tube (by breaking the glass) and carefully sliced into 1–2 mm thick sections across the cylindrical axis with a tile cutter. The burrs are removed, each slice weighed to the nearest milligram and strung onto a stainless steel or copper wire taking care to keep then in known sequence. This is done for each sample at a given monomer feed. The wire is made into a closed loop and placed in 50 ml of toluene for each gram of polymer. These flasks are then heated to reflux for 16 hours (overnight) and cooled. Each loop is successively removed from the flask and placed in a small crystallizing dish of fresh toluene. The slices are removed, patted dry, and weighed individually, again taking care not to disturb their sequence or to tear the swollen samples. The swell values are calculated using the following formula: swell $(\%) = (w_2 - w_1)/w_1 \times 100\%$, where $w_1$ = initial weight of polyDCPD sample and $w_2$ = weight of solvent swollen polyDCPD sample. Each swell valve shown in the following Tables is the average of two samples. A swell value of less than 100% is preferred. For these control examples, these values are recorded in Table 1.

TABLE 1

| Control Example Number | Initial Temp. C. | Gel Time (sec) | Cure Time (sec) | Max. Temp C. | Swell % |
|---|---|---|---|---|---|
| 1 | 28 | 18 | 76 | 195 | 82.3 |
| 2 | 28 | 17 | 73 | 199 | 81.6 |
| 3 | 80 | 14 | 51 | 202 | 85.0 |
| 4 | 80 | 13 | 50 | 203 | 87.8 |
| 5 | 28 | 16 | 55 | 198 | 81.8 |
| 6 | 28 | 15 | 55 | 198 | 78.7 |
| 7 | 80 | 12 | 36 | 205 | 83.0 |
| 8 | 80 | 10 | 39 | 205 | 83.2 |

EXAMPLES 1 TO 9

The procedure used to test the control or standard activators was followed using similar molar quantities of various dialkylzinc activators, including diethylzinc (DEZ), di-n-butylzinc (DNBZ) and diisobutylzinc (DIBZ), in place of the TNOA/DNOA activators. A standard catalyst mixture ws used, tungsten hexachloride in t-butyl alcohol with the nonyl phenol and acetylacetone described above. The ratio of tungsten/dialkylzinc activator to DCPD monomer was varied for each activator. After combining Component A and Component B the mixture was immersed in a constant temperature bath at 80° C. The results are shown in Table 2.

TABLE 2

| Example No. | Activator | DCPD:W:Activator | Gel time (sec.) | Cure Time (sec.) |
|---|---|---|---|---|
| 1 | DEZ* | 2000:1:2.5 | 33 | 203 |
| 2 | DEZ | 1500:1:2.5 | 27 | 143 |
| 3 | DEZ | 1000:1:2.5 | 26 | 77 |
| 4 | DNBZ** | 2000:1:2.5 | 42 | 135 |
| 5 | DNBZ | 1500:1:2.5 | 40 | 120 |
| 6 | DNBZ | 1000:1:2.5 | 34 | 105 |
| 7 | DIBZ*** | 2000:1:2.5 | 63 | 143 |
| 8 | DIBZ | 1500:1:2.5 | 53 | 132 |
| 9 | DIBZ | 1000:1:2.5 | 42 | 127 |

*diethylzinc = DEZ
**di-n-butylzinc = DNBZ
***diisobutylzinc = DIBZ

The data from Examples 1 through 9 clearly show the significant increase in gel and cure times of the dicyclopentadiene solutions containing the dibutylzinc compounds when compared to Control Examples 3 and 4. It can be noted that as the concentration of the tungsten catalyst and dibutylzinc compound increases, a decrease in gel and cure times is seen.

EXAMPLES 10 TO 14

In Examples 10 through 14 the effect of catalyst concentration on residual monomer level was measured. The same catalyst solution was used as in Examples 1 through 9. The dialkylzinc compound used in Examples 10 through 14 was diethylzinc. Gel times the cure times were measured as above. The results are shown in Table 3. These results are also comparable to Control Examples 3 and 4 with a significant increase in gel and cure times seen.

TABLE 3

| Example No. | DCPD:W:Zn | Gel Time (sec) | Cure Time (sec) | Residual DCPD wt % |
|---|---|---|---|---|
| 10 | 2000:1:2.5 | 30 | 213 | 3.35 |
| 11 | 1750:1:2.5 | 30 | 165 | 2.60 |
| 12 | 1500:1:2.5 | 27 | 143 | 2.08 |
| 13 | 1250:1:2.5 | 27 | 107 | 1.56 |

TABLE 3-continued

| Example No. | DCPD:W:Zn | Gel Time (sec) | Cure Time (sec) | Residual DCPD wt % |
|---|---|---|---|---|
| 14 | 1000:1:2.5 | 26 | 77 | 1.86 |

As the catalyst concentration was increased, the gel times and cure times decreased. In general, the residual monomer level also decreased in relation to the increase in catalyst concentration.

EXAMPLES 15 TO 16

In Examples 15 and 16, a Lewis base, bis(methoxy)ethyl ether (diglyme), is added in volumes equal to the diethylzic activator compound for the purpose of further delaying gel and cure times. In Example 15 as soon as the two equal quantities of DCPD, one containing the standard tungsten catalyst used in the previous examples and one containing a diethylzinc activator with diglyme are mixed, the container is immersed in a constant temperature bath maintained at 80° C. In Example 16 the identical procedure was followed except that the mixtures were maintained at 30° C.

Table 4 shows the gel times, cure times, percent residual monomer and swell values for the diethylzinc diglyme activator at 80° C. for Example 15 and 30° C. for Example 16.

These results show the diethylzinc significantly increasing the gel and cure times so that it would be possible to combine the activator and catalyst streams together up to 40 minutes prior to injection into the mold. The room temperature polymerization, Example 16, does not cure at room temperature, however, the gelled material can be cured by heating the inerted test tube in a 80° C. bath up to 4 hours later.

TABLE 4

| DCPD:W:Zn:diglyme | Gel Time (sec) | Cure Time (sec) | Residual DCPD wt % | Swell % |
|---|---|---|---|---|
| Example 15 - at 80° C. | | | | |
| 2000:1:2.5:2.5 | 65 | 186 | 4.28 | 148 |
| 1500:1:2.5:2.5 | 56 | 140 | 2.86 | 172 |
| 1000:1:2.5:2.5 | 52 | 120 | 2.20 | 220 |
| Example 16 - at 30° C. | | | | |
| 2000:1:2.5:2.5 | 2400 | no cure | — | — |
| 1500:1:2.5:2.5 | 1800 | no cure | — | — |
| 1000:1:2.5:2.5 | 300 | no cure | — | — |

EXAMPLES 17 TO 20

In the following series of examples the results shown demonstrate a comparison of gel and cure times upon substituting various phenolic compounds for the nonylphenol used in the previous examples. In Examples 17 and 18 2,6-di-tert-butyl-p-cresol (BHT) is the phenol used to solubilize the tungsten compound. This phenol is used with the three dialkylzinc compounds used in previous examples, diethylzinc, di-n-butylzinc and diisobutylzinc. In Example 17 the mixture is placed in a constant temperature bath at 80° C. In Example 18 the mixture is held at room temperature, 30° C. The results are shown in Table 5. In Examples 19 and 20 the same zinc compounds are used. The phenol used is 2,6-diisopropylphenol (DIPP). In Example 19 the mixtures are placed at a constant temperature bath at 80° C, while the mixtures in Example 20 are held at 30° C. These results are shown in Table 6. The results may be compared with those in Control Examples 1-4 at the same temperatures. The phenols substituted for the nonylphenol in these examples, in general, decreased the gel times, cure times and resulted in low residual monomer levels. In particular the DIPP based catalyst produced residual monomer levels well below 1%.

TABLE 5

Gel and Cure Times for Dialkylzinc Activators With BHT Based Catalyst

| Dialkylzinc | DCPD:W:Zn | Gel Time (sec) | Cure Time (sec) | Residual DCPD wt % | Swell % |
|---|---|---|---|---|---|
| Example 17: WCl$_6$/Bu-t-OH/BHT/acac at 80° C. | | | | | |
| DEZ | 1000:1:2.5 | 6 | 41 | 0.85 | 250 |
| DEZ | 1500:1:2.5 | 10 | 46 | 1.07 | 210 |
| DEZ | 2000:1:2.5 | 13 | 73 | 1.43 | 185 |
| DNBZ | 1000:1:2.5 | 9 | 49 | 0.97 | 170 |
| DNBZ | 1500:1:2.5 | 18 | 76 | 2.51 | 150 |
| DNBZ | 2000:1:2.5 | 19 | 87 | 2.39 | 144 |
| DIBZ | 1000:1:2.5 | 24 | 106 | 3.36 | 125 |
| DIBZ | 1500:1:2.5 | 26 | 113 | 4.81 | 120 |
| DIBZ | 2000:1:2.5 | 28 | 107 | 4.87 | 120 |
| Example 18: WCl$_6$/Bu-t-OH/BHT/acac at 30° C. | | | | | |
| DEZ | 1000:1:2.5 | 10 | 41 | 0.29 | 266 |
| DEZ | 1500:1:2.5 | 12 | 49 | 0.51 | 209 |
| DEZ | 2000:1:2.5 | 17 | 61 | 0.57 | 183 |
| DNBZ | 1000:1:2.5 | 11 | 49 | 0.66 | 162 |
| DNBZ | 1500:1:2.5 | 17 | 88 | 0.88 | 145 |
| DNBZ | 2000:1:2.5 | 27 | 117 | 1.09 | 144 |
| DIBZ | 1000:1:2.5 | 40 | 195 | 1.27 | 127 |
| DIBZ | 1500:1:2.5 | 52 | 261 | 1.32 | 117 |
| DIBZ | 2000:1:2.5 | 75 | no cure | — | — |

TABLE 6

Gel and Cure Times For Dialkylzinc Activators With DIPP Based Catalyst

| Dialkylzinc | DCPD:W:Zn | Gel Time (sec) | Cure Time (sec) | Residual DCPD wt % | Swell % |
|---|---|---|---|---|---|
| Example 19: WCl$_6$/Bu-t-OH/DIPP/acac at 80° C. | | | | | |
| DEZ | 1000:1:2.5 | 1 | 27 | 0.81 | 158 |
| DEZ | 1500:1:2.5 | 1 | 28 | 0.19 | 158 |
| DEZ | 2000:1:2.5 | 1 | 29 | 0.22 | 150 |
| DNBZ | 1000:1:2.5 | 2 | 29 | 0.11 | 130 |
| DNBZ | 1500:1:2.5 | 5 | 42 | 0.12 | 133 |
| DNBZ | 2000:1:2.5 | 6 | 49 | 0.18 | 123 |
| DIBZ | 1000:1:2.5 | 8 | 42 | 0.61 | 102 |
| DIBZ | 1500:1:2.5 | 10 | 67 | 0.55 | 105 |
| DIBZ | 2000:1:2.5 | 14 | 70 | 1.37 | 101 |
| Example 20: WCl$_6$/Bu-t-OH/DIPP/acac at 30° C. | | | | | |
| DEZ | 1000:1:2.5 | 1 | 25 | 0.10 | 150 |
| DEZ | 1500:1:2.5 | 1 | 30 | 0.16 | 148 |
| DEZ | 2000:1:2.5 | 1 | 31 | 0.29 | 140 |
| DNBZ | 1000:1:2.5 | 2 | 27 | 0.22 | 120 |
| DNBZ | 1500:1:2.5 | 4 | 39 | 0.16 | 121 |
| DNBZ | 2000:1:2.5 | 6 | 46 | 0.14 | 117 |
| DIBZ | 1000:1:2.5 | 9 | 69 | 0.05 | 90 |
| DIBZ | 1500:1:2.5 | 12 | 96 | 0.15 | 95 |
| DIBZ | 2000:1:2.5 | 28 | 141 | 0.31 | 85 |

EXAMPLES 21 TO 22

In Examples 21 and 22 polymerizations are carried out with diglyme added in volume equal to the dialkylzinc. The results are shown in Table 7. The DCPD monomer was the same as in Control Examples 7 and 8. The diglyme increased gel and cure times while maintaining low residual monomer levels.

EXAMPLES 23 TO 24

A series of polymerizations was carried out wherein the dialkylzinc activator was moderated by pyridine, a Lewis base. Although the dialkylzinc activators were found to increase gel times and cure times significantly as compared to the alkyl aluminum activators, in some applications it would be desisrable to further increase the gel and cure times. In Examples 23 and 24 the effect of addition of 2 volumes pyridine (py) to each volume of dialkylzinc is shown. Even with the polymerizations in Example 23 carried out at 30° C., the polymerization mixtures of Example 24 which are carried out at 80° C. have greatly lengthened gel and cure times with the addition of the pyridine moderator. The result with diethylzinc, di-n-butylzinc and diisobutylzinc are shown in Table 8. The addition of pyridine increased the gel times and maintained the low level of residual monomer shown in Table 6.

TABLE 7

Gel and Cure Times for Dialkylzinc Activators With Diglyme As Lewis Base

| DCPD:W:Zn:DG* | Dialkylzinc | Gel Time (sec) | Cure Time (sec) | Residual DCPD wt % | Swell % |
|---|---|---|---|---|---|
| Example 21: WCl_6/Bu-t-OH/DIPP/acac at 80° C. | | | | | |
| 1500:1:2.5:2.5 | DEZ | 16 | 52 | 0.37 | 168 |
| 1500:1:2.5:2.5 | DNBZ | 13 | 54 | 0.20 | 131 |
| 1500:1:2.5:2.5 | DIBZ | 23 | 80 | 0.48 | 108 |
| Example 22: WCl_6/Bu-t-OH/DIPP/acac at 30° C. | | | | | |
| 1500:1:2.5:2.5 | DEZ | 15 | 69 | 0.20 | 166 |
| 1500:1:2.5:2.5 | DNBZ | 12 | 76 | 0.50 | 126 |
| 1500:1:2.5:2.5 | DIBZ | 47 | 186 | 0.63 | 105 |

*Diglyme

TABLE 8

Gel and Cure Times for Dialkylzincs and Dialkylzinc/Pyridine Activators With 2,6-Dichlorophenol Based Catalyst

| DCPD:W:Zn | Activator | Gel Time (sec) | Cure Time (sec) | Residual DCPD wt % | Swell % |
|---|---|---|---|---|---|
| Example 23: WCl_6/Bu-t-OH/2,6-DCP*/acac at 30° C. | | | | | |
| 2000:1:2.5 | DEZ | instant | 15 | 1.62 | 65 |
| 2000:1:2.5 | DNBZ | 1 | 31 | 2.17 | 75 |
| 2000:1:2.5 | DIBZ | 7 | 55 | 0.47 | 58 |
| Example 24: WCl_6/Bu-t-OH/2,6-DCP/acac at 80° C. | | | | | |
| 2000:1:2.5 | DEZ/2py** | 61 | 102 | 1.45 | 196 |
| 2000:1:2.5 | DNBZ/2py | 78 | 116 | 3.86 | 98 |
| 2000:1:2.5 | DIBZ/2py | 94 | 163 | 1.25 | 91 |

*2,6-dichlorophenol
**2py--pyridine is present in 2 times the weight dialkylzinc

EXAMPLE 25

In Example 25 a series of experiments was performed to compare gel and cure times achieved without a Lewis base, with those found with pyridine and with pyrazine. The phenol used to solubilize the tungsten catalyst is 2,6-diisopropylphenol (DIPP). The results are shown in Table 9. The residual monomer levels were excellent. An increase in gel and cure times appeared directly proportional to the addition of the pyridine or pyrazine with stepwise increases shown.

TABLE 9

Gel and Cure Times for DIBZ, DIBZ-Pyridine and DIBZ-Pyrazine Activators Using 2,6-Diisopropylphenol Based Catalyst at 80° C.

| DCPD:W:Zn: Lewis Base | Activator | Gel Time (sec) | Cure Time (sec) | Residual DCPD % | Swell % |
|---|---|---|---|---|---|
| 2000:1:2.5:0 | DIBZ | 4 | 71 | 0.66 | 98 |
| 2000:1:2.5:1 | DIBZ/pyridine | 54 | 137 | 0.50 | 106 |
| 2000:1:2.5:2 | DIBZ/pyridine | 92 | 160 | 0.53 | 112 |
| 2000:1:2.5:1 | DIBZ/pyrazine | 37 | 111 | 0.43 | 109 |
| 2000:1:2.5:2 | DIBZ/pyrazine | 63 | 180 | 0.83 | 105 |

EXAMPLE 26

In Example 26 a series of experiments was performed to compare gel and cure times for various Lewis bases including dibutylether (BE), diglyme (DG), triisopropyl phosphite (TIPP), tetramethylethylene diamine (TMEDA), pyridine (py), and pyrazine (pyz). The dialkylzinc was diisobutylzinc. The monomer was the same as in Control Examples 7 and 8. These mixtures were placed in a constant temperature bath at 80° C. The results shown in Table 10 are for the standard catalytic mixture except for the use of 2,6-diisopropylphenol to solubilize the tungsten catalyst. Low residual monomer levels were maintained. In addition, the wide range of gel and cure times obtained would allow one to select a Lewis base to be used according to the complexity and size of the mold being used. The larger and more complex the item being molded, the longer the gel and cure times should be.

TABLE 10

Gel and Cure Times for Diisobutylzinc/ Lewis Base Activators at 80° C.

| DCPD:W:Zn:Lewis Base | Lewis Base | Gel Time (sec) | Cure Time (sec) | Residual DCPD wt % | Swell % |
|---|---|---|---|---|---|
| 2000:1:2.5:0.0 | — | 4 | 75 | 0.40 | 100 |
| 2000:1:2.5:5 | BE | 9 | 78 | 0.74 | 105 |
| 2000:1:2.5:2.5 | Diglyme | 26 | 86 | 0.45 | 103 |
| 2000:1:2.5:5 | TIPP | 50 | 146 | 0.78 | 108 |
| 2000:1:2.5:2.5 | TMEDA | 50 | — | — | — |
| 2000:1:2.5:5 | py | 97 | 202 | 0.85 | 114 |

EXAMPLE 27

In Example 27 the effect of the addition of vinylnorborene comonomer to the dicyclopentadiene was measured. The zinc compound used was diethylzinc. The vinylnorbornene (VNB) was added in amounts of 0.5%, 1.0% and 2.0% to 99.5%, 99.0% and 98.0% respectively DCPD. A control without VNB was also completed and is shown in Table 1 with the other values.

TABLE 11

| % VNB in Monomer | DCPD:W:Zn | Gel Time (sec) | Cure Time (sec) | Residual DCPD % | Swell % |
|---|---|---|---|---|---|
| 0.0 | 2000:1:2.5 | 30 | 163 | 3.06 | 145 |
| 0.5 | 2000:1:2.5 | 30 | 154 | 3.35 | 154 |
| 1.0 | 2000:1:2.5 | 44 | 154 | 3.00 | 165 |
| 2.0 | 2000:1:2.5 | 56 | 130 | 2.58 | 181 |

EXAMPLES 28 TO 30

Catalyst and activator streams were prepared for a molding trial in an Accuratio TM reaction injection molding machine. The catalyst stream was comprised of 7.5 lb. of dicyclopentadiene containing 6 wt. % solution-polymerized random styrene-butadiene rubber (Stereon 720A by B.F. Goodrich), 97 ml of 0.5M tungsten catalyst, 24 ppm rose oxide and 1 wt. % Irganox 1070 (antioxidant). In the control example, the activator stream was prepared by mixing 145 ml. of a 1 M alkyl aluminum activator solution with 7.5 lbs. of the rubberized dicyclopentadiene to give a molar ratio of dicyclopentadiene:Al of 500:3. The two component streams were mixed 1 to 1 in a mix head and injected into a 10"×10"×1/8" thick plaque mold, which was maintained at approximately 80° C. The final DCPD:W:Al ratio was 1000:1:3. The alkyl aluminum activator in Control Example was an 85:15 molar mixture of tri-n-octyl aluminum (TNOA) and dioctyl aluminum iodide moderated with an equivalent amount of diglyme. In example 28, 73 ml of 1.1 M diethylzinc is substituted for the alkyl aluminum activator in a ratio of DCPD:W:Zn of 1500:1:2.5. Example 29 follows the same procedure as Example 28 except that ethylene propylene diene monomer rubber (EPDM) is the elastomer used. In Example 30 the same procedure as Example 29 is followed except that the ratio of DCPD:W:Zn is 1000:1:2.5. The physical properties for these Accuratio runs are in Table 12. Low levels for residual monomer are shown in Examples 29 and 30.

TABLE 12

| Property | Control Example | Example 28 | Example 29 | Example 30 |
|---|---|---|---|---|
| Notched Izod (ft.lbs./in.) | 8.0 | 0.9 | 8.3 | 7.4 |
| Flex Modulus (Kpsi) | 270.0 | — | 220.0 | 209.0 |
| Tensile Modulus (Kpsi) | 10.0 | — | 6.8 | 6.3 |
| Tensile Strength (Kpsi) | 5.0 | — | 4.1 | 3.4 |
| HDT @ 624 psi (°C.) | 85.0 | 79.0 | 100.0 | 89.0 |
| $T_g$ (°C.) | 120.0 | 128.0 | 140.0 | 134.0 |
| Residual DCPD (wt. %) | 1.0 | 2.4 | 1.5 | 1.0 |
| Swell (%) | 80.0 | 205.0 | 191.0 | 229.0 |

What is claimed is:

1. In a process for preparing molded objects wherein a liquid reaction mass comprised of a metathesis polymerizable cycloolefin, a metatheis polymerization catalyst, a catalyst activator and a reaction rate moderator are charged to a mold wherein polymerization will take place, the improvement wherein said catalyst activator is selected from the group consisting of dialkylzinc, alkylzinc halide and aromatic zinc compounds.

2. The process of claim 1 wherein said cycloolefin is selected from the group consisting of dicyclopentadiene, and mixtures of dicyclopentadiene with a comonmer selected from the group consisting of higher cyclopentadiene oligomers, norborene, norbornadiene, 4-alkylidene norbornenes, vinyl norbornene, dimethanooctahydronaphthalene, and dimethanohexahydronaphthalene.

3. The process of claim 2 wherein the dialkyl zinc compound is selected from the group consisting of diethylzinc, diisobutylzinc and di-n-butylzinc and the aromatic zinc compound is diphenylzinc.

4. The process of claim 3 wherein the metathesis polymerization catalyst is selected from the group consisting of molybdenum halides and tungsten halides.

5. The process of claim 4 wherein said tungsten halide is selected from the group consisting of $WCl_6$, $WOCl_4$ and mixtures thereof.

6. The process of claim 5 wherein said reaction rate moderator is selected from the group consisting of dibutyl ether, bis(methoxy)ethyl ether, trialkyl phosphines, trialkyl phosphites, triaryl phosphines and triaryl phosphites.

7. The process of claim 5 wherein the reaction rate moderator comprises a sterically unhindered or partially unhindered nucleophilic Lewis base selected from the group consisting of unsaturated cyclic amines and saturated polycyclic amines.

8. The process of claim 5 wherein the reaction rate moderator is selected from the group consisting of pyridine, substituted pyridines, pyrazine, substituted pyrazines, quinoline and quinoxaline.

9. The process of claim 8 wherein the tungsten compound is solubilized with a phenolic compound.

10. The process of claim 9 wherein said phenolic compound is selected from the group consisting of t-butyl phenol, t-octyl phenol, nonyl phenol, 2,6-dichlorophenol, 2,6-ditert-butyl-p-cresol and 2,6-diisopropylphenol.

* * * * *

UNITED STATES PATENT AND TRADEMARK OFFICE
CERTIFICATE OF CORRECTION

PATENT NO. : 4,882,401

DATED : November 21, 1989

INVENTOR(S) : Andrew Bell

It is certified that error appears in the above-identified patent and that said Letters Patent is hereby corrected as shown below:

Column 1, line 33 " themold "

should read -- the mold --

Column 1, line 38 " ana "

should read -- an --

Column 1, line 61, " flud "

should read -- fluid --

Column 2, line 9 " subsittuted "

should read -- substituted --

Column 2, line 53 "nd "

should read -- and --

Column 2, line 68 " groupcontains "

should read -- group contains --

Column 3, line 2 " nd "

should read -- and --

Column 3, line 12 "ws "

should read -- was --

UNITED STATES PATENT AND TRADEMARK OFFICE
CERTIFICATE OF CORRECTION

PATENT NO. : 4,882,401
DATED : November 21, 1989
INVENTOR(S) : Andrew Bell

It is certified that error appears in the above-identified patent and that said Letters Patent is hereby corrected as shown below:

Column 3, line 16 " objct "

should read -- object --

Column 3, line 26 " degrease "

should read -- decrease --

Column 3, line 35 " as diphenylzinc metathesis "

should read -- as diphenylzinc as the activator component, in the second part of the metathesis --

Column 3, line 46 " s "

should read -- is --

Column 5, line 50 " then "

should read -- them --

Column 6, line 21 " ws "

should read -- was --

UNITED STATES PATENT AND TRADEMARK OFFICE
CERTIFICATE OF CORRECTION

PATENT NO. : 4,882,401

DATED : November 21, 1989

INVENTOR(S) : Andrew Bell

It is certified that error appears in the above-identified patent and that said Letters Patent is hereby corrected as shown below:

Column 10, line 41 " Table 1 "
should read -- Table 11 --

Signed and Sealed this

Sixteenth Day of October, 1990

Attest:

HARRY F. MANBECK, JR.

*Attesting Officer*      *Commissioner of Patents and Trademarks*